United States Patent
Lee et al.

(10) Patent No.: US 9,489,540 B2
(45) Date of Patent: Nov. 8, 2016

(54) MEMORY CONTROLLER WITH ENCRYPTION AND DECRYPTION ENGINE

(71) Applicant: SAMSUNG ELECTRONICS CO., LTD., Suwon-Si, Gyeonggi-Do (KR)

(72) Inventors: Heon Soo Lee, Hwaseong-si (KR); Hong-Mook Choi, Bucheon-si (KR); Sang-Hyun Park, Seoul (KR)

(73) Assignee: SAMSUNG ELECTRONICS CO., LTD., Suwon-Si, Gyeonggi-Do (KR)

(*) Notice: Subject to any disclaimer, the term of this patent is extended or adjusted under 35 U.S.C. 154(b) by 0 days.

(21) Appl. No.: 14/702,167

(22) Filed: May 1, 2015

(65) Prior Publication Data

US 2015/0235053 A1    Aug. 20, 2015

Related U.S. Application Data

(63) Continuation of application No. 13/718,382, filed on Dec. 18, 2012.

(30) Foreign Application Priority Data

May 4, 2012  (KR) .................. 10-2012-0047743

(51) Int. Cl.

| | | |
|---|---|---|
| G06F 21/00 | (2013.01) | |
| G06F 21/72 | (2013.01) | |
| G06F 13/28 | (2006.01) | |
| G06F 3/06 | (2006.01) | |
| H04L 9/08 | (2006.01) | |

(52) U.S. Cl.
CPC ............ *G06F 21/72* (2013.01); *G06F 3/0619* (2013.01); *G06F 3/0655* (2013.01); *G06F 3/0679* (2013.01); *G06F 13/28* (2013.01); *H04L 9/0822* (2013.01); *G06F 2206/1014* (2013.01); *H04L 2209/12* (2013.01)

(58) Field of Classification Search
None
See application file for complete search history.

(56) References Cited

U.S. PATENT DOCUMENTS

| | | |
|---|---|---|
| 6,772,955 B2 | 8/2004 | Yoshimoto et al. |
| 7,752,497 B2 | 7/2010 | Buttlar et al. |
| 7,835,518 B2 | 11/2010 | Elhamias et al. |
| 7,934,049 B2 | 4/2011 | Holtzman et al. |
| 8,347,113 B2 | 1/2013 | Hsueh |
| 8,555,015 B2 | 10/2013 | Muchsel et al. |
| 8,589,700 B2 | 11/2013 | Herman et al. |
| 2003/0226018 A1 | 12/2003 | Tardo et al. |

(Continued)

FOREIGN PATENT DOCUMENTS

| | | |
|---|---|---|
| JP | 2010009174 | 1/2010 |
| KR | 1020050002103 | 1/2005 |
| KR | 1020090106143 | 10/2009 |

OTHER PUBLICATIONS

Freescale, "DSP 56300 Family Manual", 2005, Fresscale Semiconductor, p. 1-512.*

(Continued)

*Primary Examiner* — Jeffery Williams
(74) *Attorney, Agent, or Firm* — F. Chau & Associates, LLC

(57) ABSTRACT

A method of operating a system on chip (SoC) includes converting plain data into cipher data by using an encryption key and transmitting the cipher data directly to a memory controller which controls an operation of a non-volatile memory. The encryption key may be output by a one-time programmable (OTP) memory.

14 Claims, 18 Drawing Sheets

(56) References Cited

U.S. PATENT DOCUMENTS

| | | |
|---|---|---|
| 2006/0090084 A1 | 4/2006 | Buer |
| 2007/0074046 A1 | 3/2007 | Czajkowski et al. |
| 2008/0192928 A1 | 8/2008 | Yu et al. |
| 2009/0144559 A1 | 6/2009 | Lee et al. |
| 2009/0228639 A1 | 9/2009 | Cho |
| 2010/0077230 A1 | 3/2010 | Chambers et al. |
| 2010/0191959 A1 | 7/2010 | Czajkowski |
| 2010/0254537 A1 | 10/2010 | Buer et al. |
| 2011/0085657 A1 | 4/2011 | Matthews, Jr. |
| 2011/0154061 A1 | 6/2011 | Chilukuri et al. |
| 2011/0219150 A1 | 9/2011 | Piccirillo et al. |
| 2015/0067355 A1* | 3/2015 | Hall ............ G06F 12/145 713/193 |

OTHER PUBLICATIONS

Freescale, "DSP 56300 Family Manual", 2005, Freescale Semiconductor, pp. 1-512.

* cited by examiner

MEMORY CONTROLLER WITH ENCRYPTION AND DECRYPTION ENGINE

CROSS-REFERENCE TO RELATED APPLICATIONS

This application is a continuation of co-pending U.S. application Ser. No. 13/718,382 filed Dec. 18, 2012, which claims priority to Korean Patent Application No. 10-2012-0047743, filed on May 4, 2012, in the Korean Intellectual Property Office, the disclosure of which is incorporated by reference in its entirety herein.

BACKGROUND

1. Technical Field

Exemplary embodiments of the inventive concept relate to a system on chip (SoC), a method of operating the SoC, and devices including the SoC.

2. Discussion of Related Art

A main memory may receive programs that are to be executed by a central processing unit (CPU) and data required by the CPU, from a separate storage medium, for example, a non-volatile memory device. The main memory may transmit data to the separate storage medium, for example, the non-volatile memory device, to store the data.

Data exchanged between the main memory and the non-volatile memory device may be encrypted to prevent unauthorized users from accessing the data. Performance of a system including the main memory and the non-volatile memory device may vary based on the path used to exchange data between the main memory and the non-volatile memory device.

SUMMARY

According to an exemplary embodiment of the present inventive concept, a method of operating a system on chip (SoC) includes converting plain data into cipher data by an engine within the SoC using an encryption key; and transmitting, by the engine, the cipher data directly to a memory controller within the SoC that controls an operation of a non-volatile memory. According to an exemplary embodiment, the plain data may be data read from a main memory via a bus under the control of a central processing unit (CPU). For example, prior to the converting, the method may include the SoC reading the plain data from the main memory. According to an exemplary embodiment, the plain data may be data output from a direct memory access (DMA) unit. For example, prior to the converting, the method may include a DMA unit within the SoC outputting the plain data to the engine.

The encryption key may be output from a one-time programmable (OTP) memory. For example, prior to the converting, the method may include an OTP within the SoC outputting the key to the engine. The encryption key may be input only according to a secure program. For example, prior to the converting, the method may include outputting the key to the engine only while a secure program is being executed (e.g., by a CPU within the SoC).

In the converting, the plain data may be converted into the cipher data in units of blocks.

According to an exemplary embodiment of the present inventive concept, a method of operating a system on chip (SoC) includes receiving, by an engine within the SoC, cipher data directly from a memory controller within the SoC which controls an operation of a non-volatile memory; and converting, by the engine, the cipher data into plain data by using an encryption key.

The method may further include transmitting the plain data to a direct memory access (DMA) unit. For example, prior to the converting, the method may further include a DMA unit within the SoC transmitting the plain data to the engine. In the converting, the cipher data may be converted into the plain data in units of blocks.

According to an exemplary embodiment of the present inventive concept, a system on chip (SoC) includes an encryption/decryption engine which encrypts first plain data into first cipher data or decrypts second cipher data into second plain data, by using an encryption key; and a memory controller which is directly connected to the encryption/decryption engine and transmits the first cipher data to a non-volatile memory or receives the second cipher data from the non-volatile memory.

The SoC may further include a one-time programmable (OTP) memory which stores the encryption key. The SoC may further include a direct memory access (DMA) unit which transmits the first plain data, which is received from a data source, to the encryption/decryption engine or transmits the second plain data, which is received from the encryption/decryption engine, to the data source. For example, the DMA unit may receive the first plain data from a device outside the SOC and transmit the first plain data to the engine or transmit the second plain data received from the engine to the device.

The DMA unit may be directly connected to the encryption/decryption engine. The SoC may further include a CPU which controls transmission of the first plain data or the second plain data between a data source and the encryption/decryption engine. For example, the data source may be a device located outside the SoC.

According to an exemplary embodiment of the present inventive concept, a system-in package includes the SoC and a data source which communicates data with a non-volatile memory under the control of the SoC. The data source may be a device outside the SoC. According to an exemplary embodiment of the present inventive concept, a system-in package includes the SoC, a non-volatile memory, and a data source which communicates data with the non-volatile memory under the control of the SoC.

According to an exemplary embodiment of the present inventive concept, a system on chip (SoC) includes a memory controller configured to control a non-volatile memory, and an encryption/decryption engine directly connected to the memory controller and configured to encrypt or decrypt data. The SoC controls transmission of data between a data source (e.g., a device outside the SoC) and the non-volatile memory. The memory controller and the engine correspond to a first data path for transmitting data.

According to an exemplary embodiment of the present inventive concept, an electronic device includes a data source; a non-volatile memory; and a system on chip (SoC) which controls transmission of data between the data source and the non-volatile memory. The SoC may include a memory controller which controls the non-volatile memory; and an encryption/decryption engine which is directly connected to the memory controller and encrypts or decrypts the data. The encryption/decryption engine may encrypt or decrypt the data by using an encryption key that is stored in a one-time programmable (OTP) memory.

According to an exemplary embodiment of the inventive concept, a system on chip (SoC) includes a data bus, a main memory controller configured to output plain data to the bus, an engine configured to encrypt the plain data from the bus into cipher data using a key, a NVM controller, a first electrical path connecting the bus to the NVM controller to bypass the encryption engine, and a second electrical path connecting the bus to the NVM controller through the encryption engine. The SoC activates only the first electrical path (e.g., deactivates the second electrical path) in a non-secure mode for sending the plain data from the bus to the NVM controller. The SoC activates only the second electrical path (e.g., deactivates the first electrical path) in a secure mode for sending the plain data to the engine and the cipher data from the engine to the NVM controller.

The first electrical path may include a path of the plain text through a multiplexer and a demultiplexer to the NVM controller. The second electrical path may include a path of the plain data through the multiplexer to the engine and a path of the cipher data through the demultiplexer to the NVM controller. The SoC may further include an OTP configured to provide a same selection signal to the multiplexer and the demultiplexer for activating one of the first and second electrical paths. The engine may be configured to decrypt cipher data received from the NVM controller across the second electrical path.

DETAILED DESCRIPTION

Herein, when one device is described as transmitting data to another device, the data is either transmitted from the one device directly (e.g., "directly transmitted") or indirectly (e.g., "indirectly transmitted") to the other device. In an exemplary embodiment where the one device directly transmits the data, the data is transmitted from the one device to the other device without passing through another device except a wire. In an exemplary embodiment where one device directly transmits the data, the data is transmitted from the one device to the other device through a multiplexer or a demultiplexer without using additional devices.

Herein, when one device is described as being connected to another device, these devices may be directly connected to one another (e.g., "connected directly") or indirectly connected (e.g., "connected indirectly") to one another. In an embodiment where the two devices are directly connected to one another, no devices are present between the two devices except a wire. In an embodiment where the two devices are directly connected to one another, no devices are present between the two devices other than a multiplexer or a demultiplexer.

It is to be understood that the apparatuses and methods described herein may be implemented in various forms of hardware, software, firmware, special purpose processors, or a combination thereof. In particular, a portion of the present inventive concept may be implemented as an application comprising program instructions that are tangibly embodied on one or more program storage devices or computer readable media (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent apparatus components and process steps depicted in the accompanying figures may be implemented in software, the connections between apparatus modules (or the logic flow of method steps) may differ depending upon the manner in which the present inventive concept is programmed.

Figure 1:
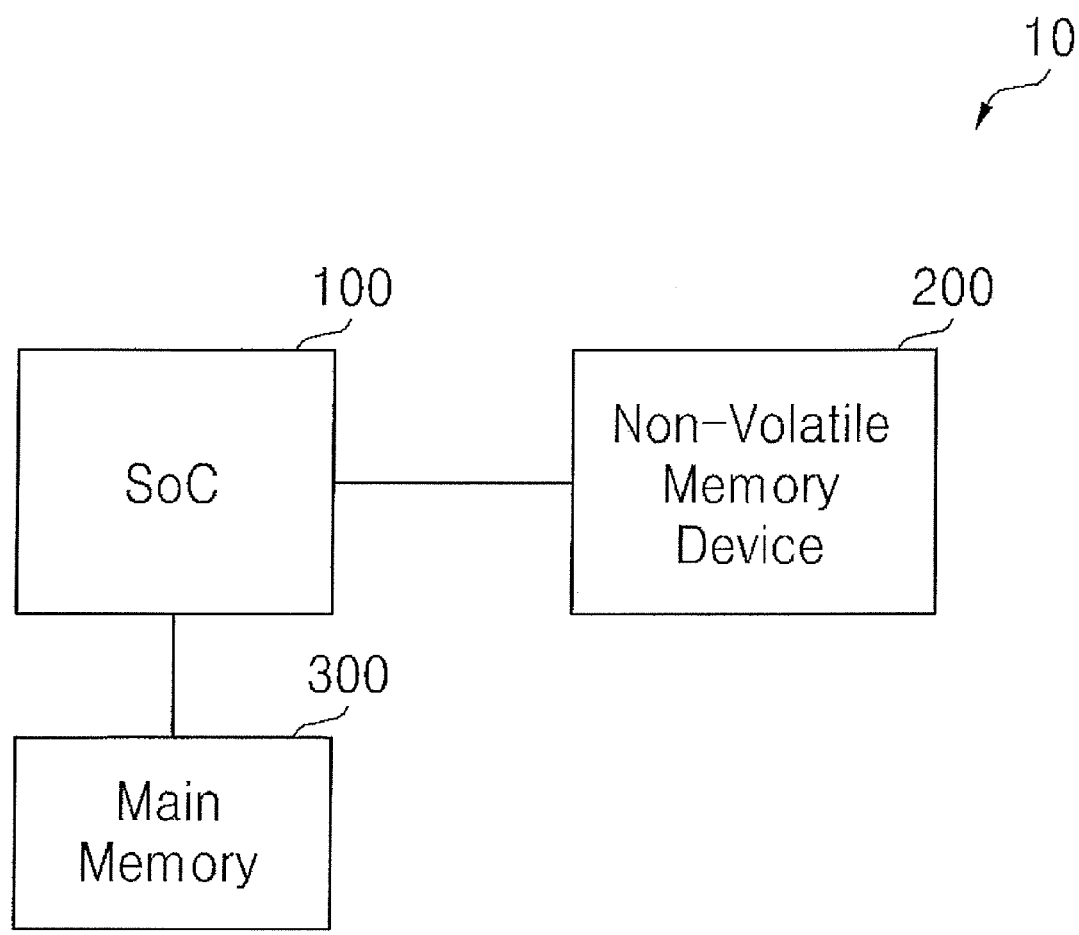
FIG. 1 is a block diagram of a system including a system on chip (SoC) according to an exemplary embodiment of the inventive concept.

FIG. 1 is a block diagram of a system 10 including a system on chip (SoC) 100 according to an exemplary embodiment of the present inventive concept. Referring to FIG. 1, the system 10 includes the SoC 100, a non-volatile memory device 200, and a main memory 300.

The system 10 may be implemented by using a personal computer (PC), a data server, or a portable device. For example, the portable device may be implemented by using a laptop computer, a mobile phone, a smart phone, a tablet PC, a personal digital assistant (PDA), an enterprise digital assistant (EDA), a digital still camera, a digital video camera, a portable multimedia player (PMP), a personal (or portable) navigation device (PND), a handheld game console, or an e-book.

The SoC 100 may control data transmission and reception between the non-volatile memory device 200 and the main memory 300. A structure and an operation of the SoC 100 will be described in detail later with reference to FIGS. 2 and 4 to 9.

The non-volatile memory device 200 may store a variety of programs and data. The non-volatile memory device 200 may be implemented by using an electrically erasable programmable read-only Memory (EEPROM), a flash memory, a magnetic random access memory (MRAM), a spin-transfer torque MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate memory (NFGM), a holographic memory, a molecular electronics memory device, an insulator resistance change memory, or the like.

The main memory 300 may receive programs which are to be executed in the SoC 100 and data required by the SoC 100, from the non-volatile memory device 200 via the SoC 100. The main memory 300 may transmit data that is to be stored, to the non-volatile memory device 200 via the SoC 100. The main memory 300 may be implemented by using a RAM, for example, a dynamic RAM (DRAM) or a static RAM (SRAM), which is a volatile memory. However, the main memory 300 is not limited to a RAM, DRAM, or SRAM, as different types of memories may be used.

Figure 2:
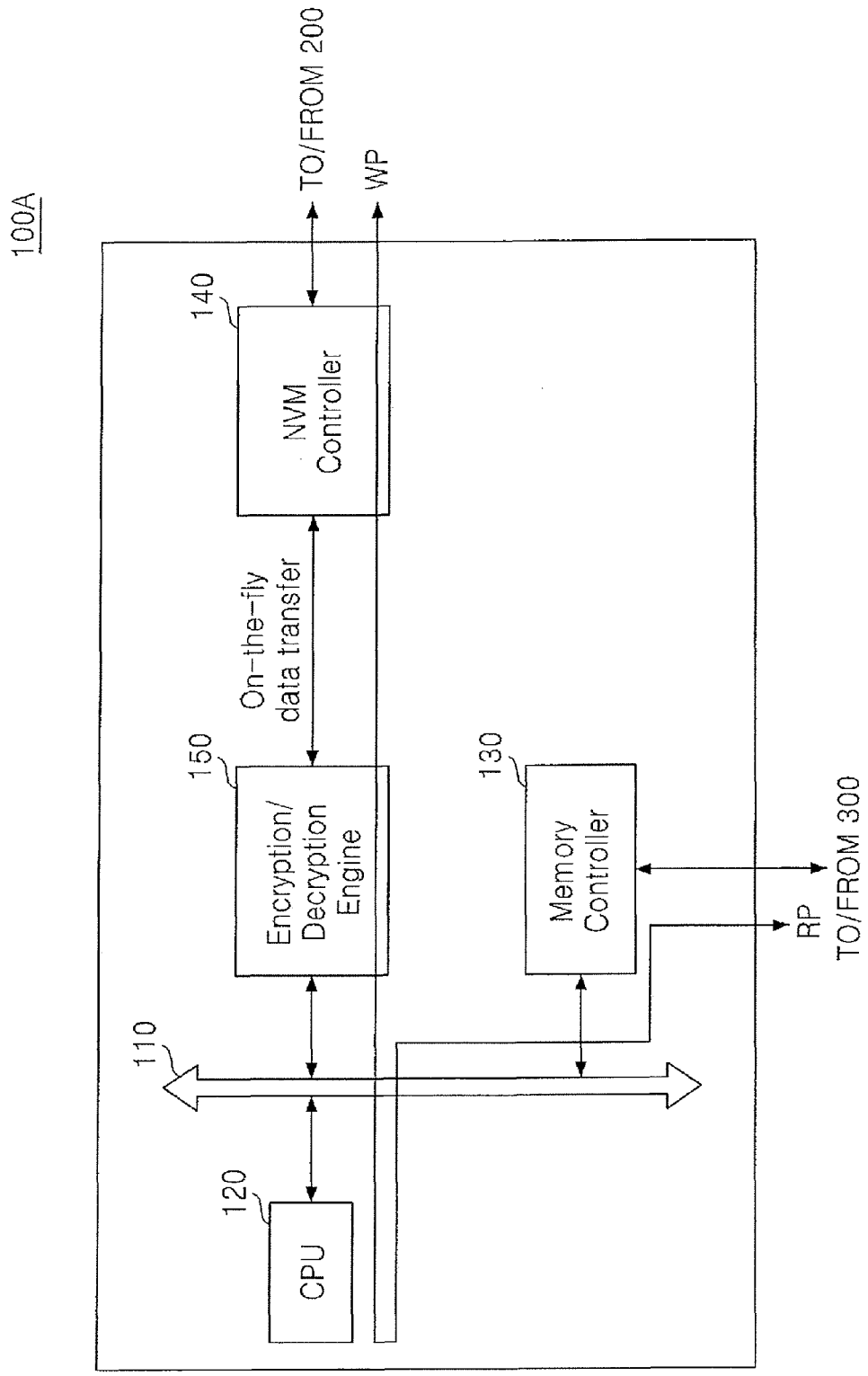
FIG. 2 is a block diagram of the SoC illustrated in FIG. 1 according to an exemplary embodiment of the inventive concept.

FIG. 2 is a block diagram of an SoC 100A, which is an embodiment of the SoC 100 of FIG. 1. Referring to FIG. 2, the SoC 100A includes a bus 110, a central processing unit (CPU) 120, a memory controller 130, a non-volatile memory controller 140, and an encryption/decryption engine 150.

The CPU 120 may be connected to the bus 110 and may control the entire operation of the SoC 100A. The memory controller 130 may control an operation of the main memory 300, for example, a read or write operation. The memory controller 130 may be connected to the bus 110.

The non-volatile memory controller 140 may control a data access operation of the non-volatile memory device 200, for example, a write operation, a read operation, a program operation, or an erase operation.

The encryption/decryption engine 150 may convert, namely, encrypt, plain data received from the main memory 300 via the memory controller 130 and the bus 110, into cipher data (e.g., encrypted data). The encryption/decryption engine 150 may transmit the cipher data directly, for example, on-the-fly, to the non-volatile memory controller 140 without passing through the bus 110.

In exemplary embodiment, the encryption/decryption engine 150 receives cipher data directly, for example, on-the-fly, from the non-volatile memory controller 140 without passing through the bus 110. The encryption/decryption engine 150 may convert, for example, decrypt, the cipher data into plain data (e.g., un-encrypted data).

An encryption key may be used in encryption or decryption of the encryption/decryption engine 150. In an exemplary embodiment, the encryption/decryption engine 150 includes a storage medium (not shown) which stores the encryption key. For example, the storage medium could be a register, a latch, flash memory, etc. According to an exemplary embodiment, the encryption key is input to the storage medium only in a secure mode. The secure mode will be described later with reference to FIG. 3.

The encryption/decryption engine 150 may encrypt or decrypt data in units of blocks of a predetermined size, for example, 64 bits, 128 bits, or 256 bits.

When the encryption/decryption engine 150 encrypts or decrypts in units of blocks, an encryption key and an algorithm which are used in encryption or decryption may be applied to each block. As an example, the algorithm may be a data encryption standard (DES) algorithm or an advanced encryption standard (AES) algorithm. However, the algorithm is not limited thereto, as other encryption or decryption algorithms may be used.

The secure mode may determine the method used by the encryption engine 150 to convert data, for example, encrypt or decrypt data in units of blocks. Examples of the secure mode include an electronic code book (ECB) mode, a cipher block chaining (CBC) mode, a propagating cipher block chaining (PCBC) mode, or a cipher feed back (CFB) mode. In ECB, each block is encrypted independently. In CBC, each block of plaintext (e.g., un-encrypted data) is XORed with the previous ciphertext block (e.g., encrypted data) before being encrypted. PCBC is a variation on CBC and is designed to extend or propagate a single bit error in the ciphertext to allow errors in transmission to be captured and the resultant plaintext to be rejected. In CFB, data may be encrypted in units smaller than the block size. However, the secure mode is not limited to being set to one of the modes described above.

In a write data path WP when data is written to the non-volatile memory device 200, plain data (e.g., un-encrypted data) output from the main memory 300 is transmitted to the CPU 120 via the memory controller 130 and the bus 110, and is then transmitted from the CPU 120 to the encryption/decryption engine 150 via the bus 110. In other words, the plain data is transmitted to the encryption/decryption engine 150 under the control of the CPU 120.

The encryption/decryption engine 150 may convert the plain data into cipher data by using an encryption key. The cipher data may be transmitted to the non-volatile memory device 200 via the non-volatile memory controller 140. In a read data path RP when data is read from the non-volatile memory device 200, cipher data output from the non-volatile memory device 200 is transmitted to the encryption/decryption engine 150 via the non-volatile memory controller 140.

The encryption/decryption engine 150 may convert the cipher data into plain data by using a decryption key. The decryption key may or may not be the same as a encryption key. The plain data may be transmitted to the CPU 120 via the bus 110 and then transmitted from the CPU 120 to the main memory 300 via the bus 110 and the memory controller 130. In other words, the plain data may be transmitted to the main memory 300 via the bus 110 and the memory controller 130 under the control of the CPU 120.

Figure 3:
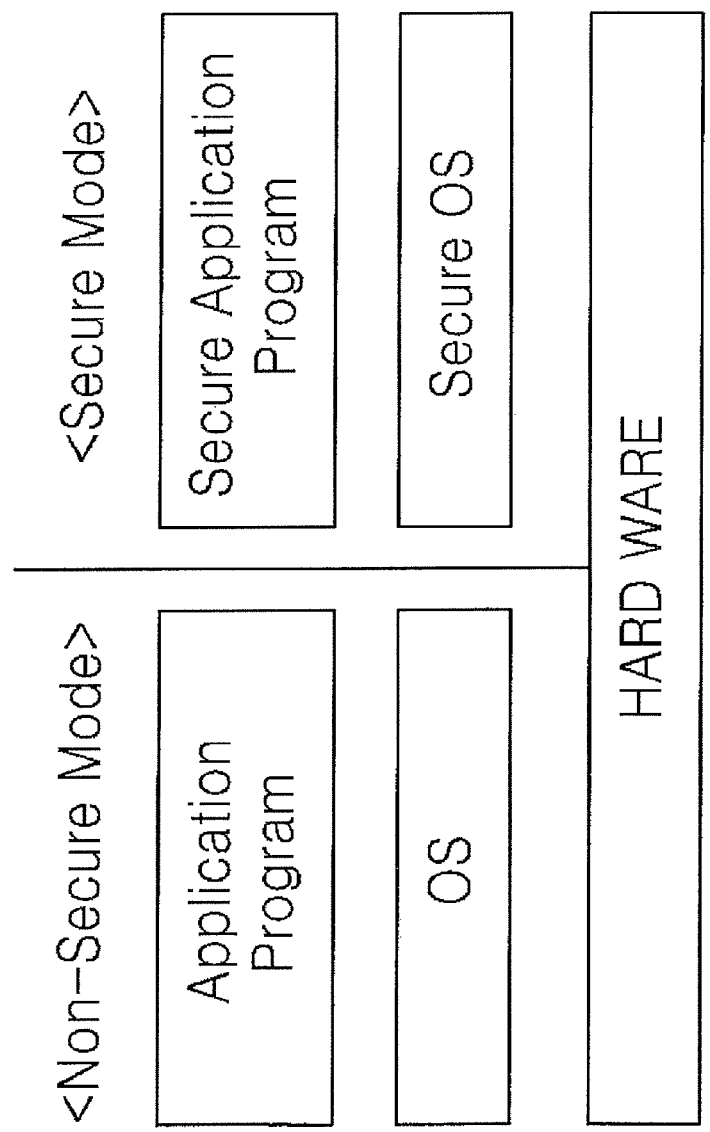
FIG. 3 is a conceptual diagram for describing a secure mode in which a encryption key can be input to an encryption/decryption engine illustrated in FIG. 2.

FIG. 3 is a conceptual diagram for describing a secure mode in which an encryption key or a decryption key can be input to the encryption/decryption engine 150 illustrated in FIG. 2. Referring to FIGS. 2 and 3, a general operating system (OS) may manage hardware and may be installed in the hardware to execute an application program.

A secure OS may also be installed in the hardware to execute a secure application program that requires security, independently from a general operating system (OS). The secure OS may be implemented by using a real time operating system (RTOS). For example, the RTOS may be used to execute an application program, which needs to be completed within a predetermined period of time, for example, a secure application program. The secure OS may be a trusted operating system that provides sufficient support for multilevel security and evidence of correctness to meet a particular set of government requirements.

A non-secure mode may denote an example where the application program is executed by the general OS, and a secure mode may denote an example where the secure application program is executed by the secure OS.

In an exemplary embodiment, while the secure application program is executed in the secure mode, the CPU 120 inputs an encryption key or a decryption key to the encryption/decryption engine 150. In an exemplary embodiment, the encryption/decryption engine 150 has access to an encryption key or a decryption key stored within itself or outside the encryption/decryption engine 150. In an exemplary embodiment, while the secure application program is executed in the secure mode, an encryption key or a decryption key may be changed or re-set. For example, when the key is changed, the next encryption/decryption that occurs uses the updated key.

Figure 4:
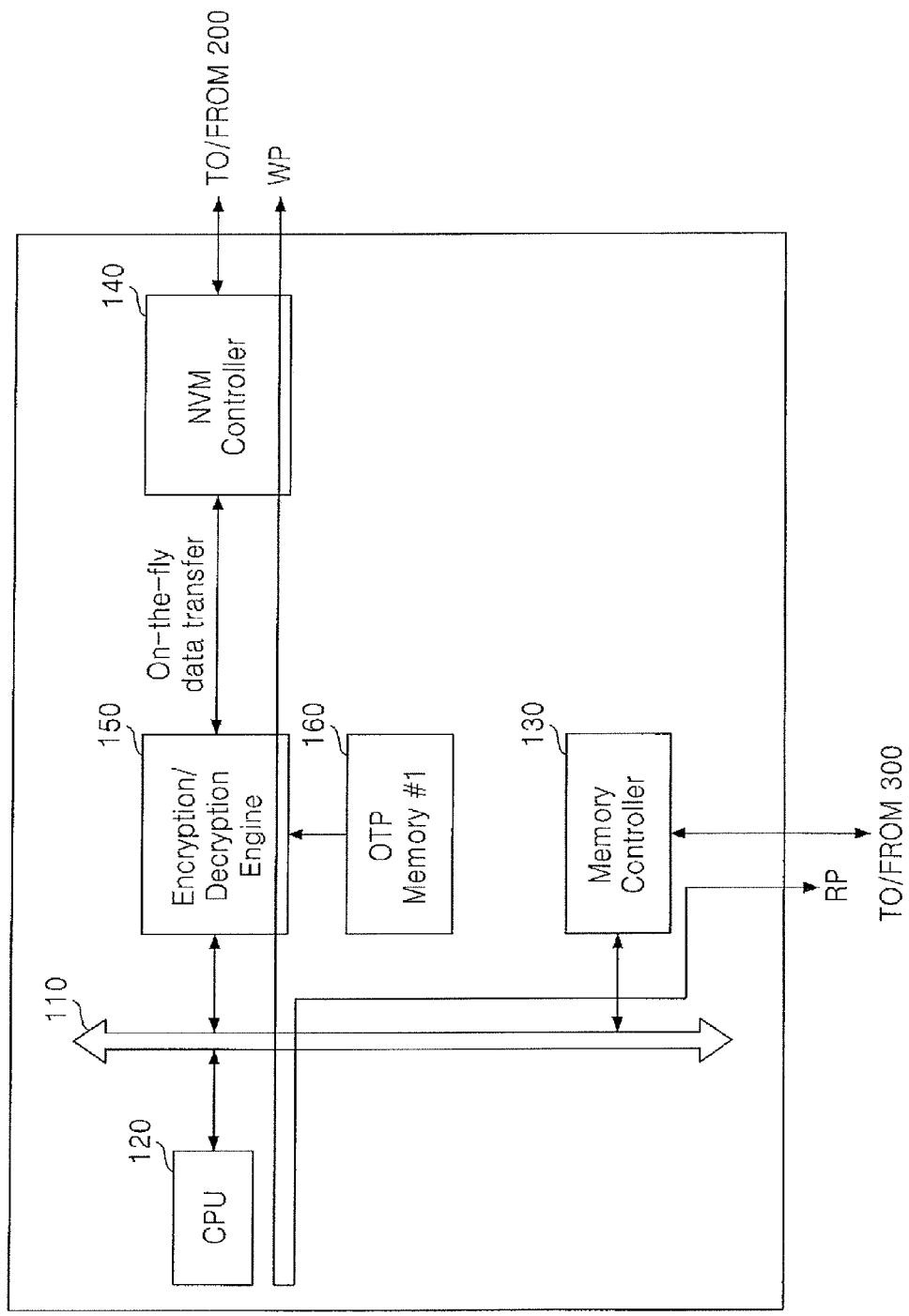
FIG. 4 is a block diagram of the SoC illustrated in FIG. 1 according to an exemplary embodiment of the inventive concept.

FIG. 4 is a block diagram of an SoC 100B which is an exemplary embodiment of the SoC 100 of FIG. 1. Referring to FIGS. 1 to 4, the SoC 100B includes a bus 110, a CPU 120, a memory controller 130, a non-volatile memory controller 140, an encryption/decryption engine 150, and a one-time programmable (OTP) memory 160. In an exemplary embodiment, the OTP memory 160 stores an encryption key or decryption key that is used in encryption or decryption by the encryption/decryption engine 150.

In an exemplary embodiment, the OTP memory 160 is implemented by using a fuse, an anti-fuse, or an e-fuse. In an exemplary embodiment, an anti-fuse is an electrical device that performs the opposite function to a fuse. For example, whereas a fuse starts with a low resistance and is designed to permanently break an electrically conductive path (e.g., when the current through the path exceeds a specified limit), an anti-fuse starts with a high resistance and is designed to permanently create an electrically conductive path (e.g., when the voltage across the anti-fuse exceeds a certain level). In an exemplary embodiment, an e-fuse allows for dynamic real-time reprogramming of computer chips.

In contrast with the SoC 100A of FIG. 2, in the SoC 100B of FIG. 4, the CPU 120 may be implemented so that it is prevented from accessing an encryption key or a decryption key stored in the OTP memory 160, even when a secure application program is executed in a secure mode. For example, the CPU 120 may be implemented so that it is prevented from reading, writing, or erasing the stored key. A write data path WP and a read data path RP of the SoC 100B of FIG. 4 are substantially the same to those of the SoC 100A of FIG. 2, respectively, except that an encryption key or a decryption key that may be used in encryption or decryption of data is provided by the OTP memory 160 to the encryption/decryption engine 150.

Figure 5:
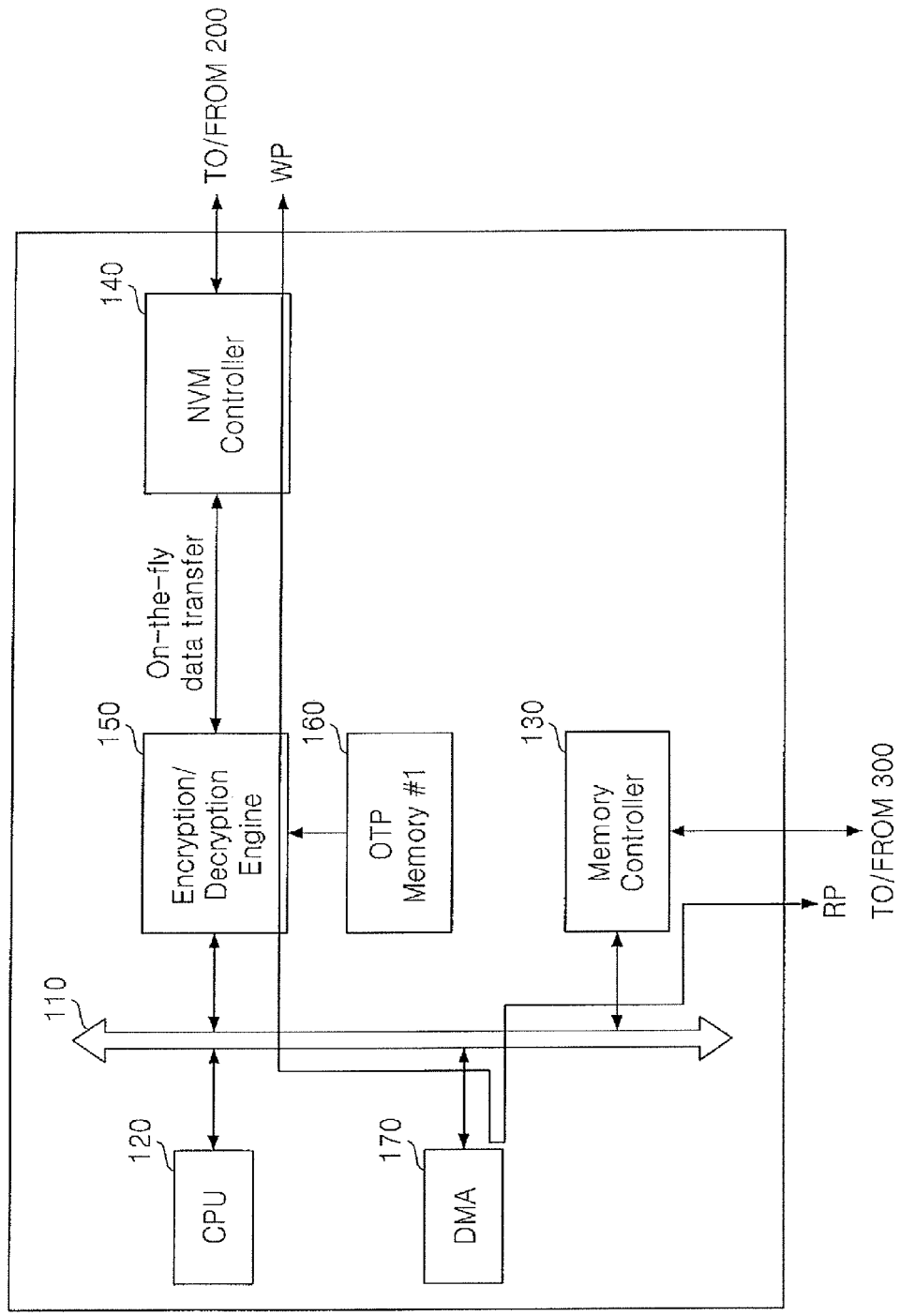
FIG. 5 is a block diagram of the SoC illustrated in FIG. 1 according to an exemplary embodiment of the inventive concept.

FIG. 5 is a block diagram of an SoC 100C which is an exemplary embodiment of the SoC 100 illustrated in FIG. 1. Referring to FIGS. 1 and 5, the SoC 100C includes a bus 110, a CPU 120, a memory controller 130, a non-volatile memory controller 140, an encryption/decryption engine 150, an OTP memory 160, and a direct memory access (DMA) unit 170.

The DMA unit 170 may access the main memory 300 or the non-volatile memory device 200 via a component (e.g., the memory controller 130, the non-volatile memory controller 140, or the encryption/decryption engine 150) without passing data through the CPU 120. In this example, the DMA unit 170 may be connected to the bus 110.

In a write data path WP when data is written to the non-volatile memory device 200, plain data output from the main memory 300 is transmitted to the DMA unit 170 via the memory controller 130 and the bus 110. The plain data is transmitted from the DMA unit 170 to the encryption/decryption engine 150 via the bus 110.

The encryption/decryption engine 150 converts the plain data into cipher data. The cipher data output from the encryption/decryption engine 150 may be transmitted directly to the non-volatile memory controller 140 and then to the non-volatile memory device 200. In other words, the encryption/decryption engine 150 may transmit the cipher data directly, for example, on-the-fly, to the non-volatile memory controller 140.

In a read data path RP when data is read from the non-volatile memory device 200, cipher data output from the non-volatile memory device 200 is transmitted to the encryption/decryption engine 150 via the non-volatile memory controller 140. In other words, the encryption/decryption engine 150 may receive cipher data directly, for example, on-the-fly, from the non-volatile memory controller 140.

The encryption/decryption engine 150 converts the cipher data into plain data. The plain data is transmitted to the DMA unit 170 via the bus 110. The plain data may be transmitted from the DMA unit 170 to the main memory 300 via the bus 110 and the memory controller 130.

Figure 6:
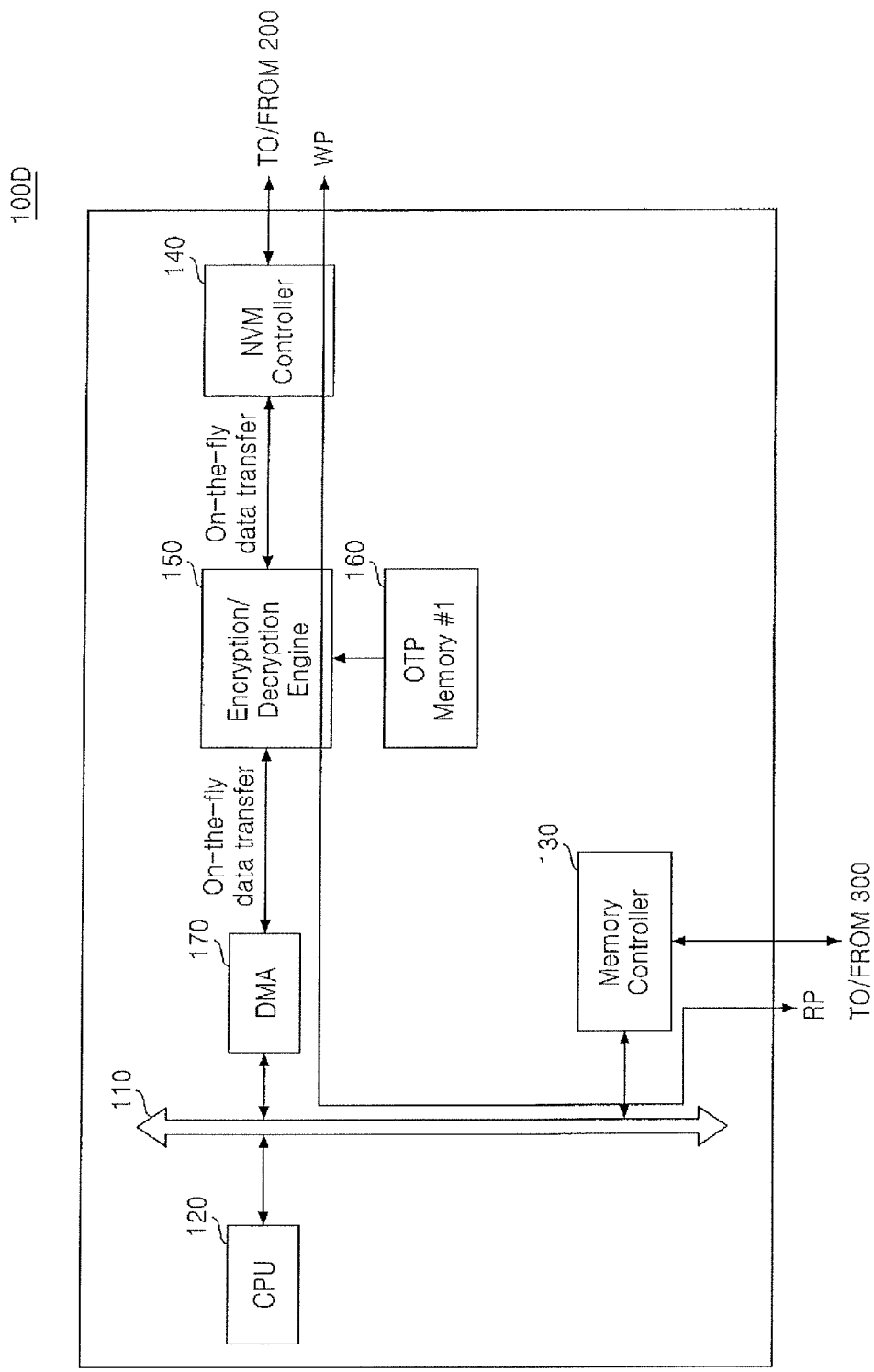
FIG. 6 is a block diagram of the SoC illustrated in FIG. 1 according to an exemplary embodiment of the inventive concept.

FIG. 6 is a block diagram of an SoC 100D which is an exemplary embodiment of the SoC 100 illustrated in FIG. 1. Referring to FIGS. 1 and 6, the SoC 100D includes a bus 110, a CPU 120, a memory controller 130, a non-volatile memory controller 140, an encryption/decryption engine 150, an OTP memory 160, and a DMA unit 170.

The DMA unit 170 may be connected between the bus 110 and the encryption/decryption engine 150. Data may be transmitted on-the-fly between the DMA unit 170 and the encryption/decryption engine 150.

In a write data path WP when data is written to the non-volatile memory device 200, plain data output from the main memory 300 is transmitted to the encryption/decryption engine 150 via the memory controller 130, the bus 110, and the DMA unit 170.

The encryption/decryption engine 150 may convert, for example, encrypt, the plain data into cipher data. The cipher data may be transmitted to the non-volatile memory device 200 via the non-volatile memory controller 140. In this example, the encryption/decryption engine 150 may transmit the cipher data directly, for example, on-the-fly, to the non-volatile memory controller 140.

In a read data path RP when data is read from the non-volatile memory device 200, cipher data output from the non-volatile memory device 200 is transmitted to the encryption/decryption engine 150 via the non-volatile memory controller 140. In this example, the encryption/decryption engine 150 may receive the cipher data directly, for example, on-the-fly, from the non-volatile memory controller 140.

The encryption/decryption engine 150 may convert, for example, decrypt, the cipher data into plain data. The plain data may be transmitted to the main memory 300 via the DMA unit 170, the bus 110, and the memory controller 130.

Figure 7:
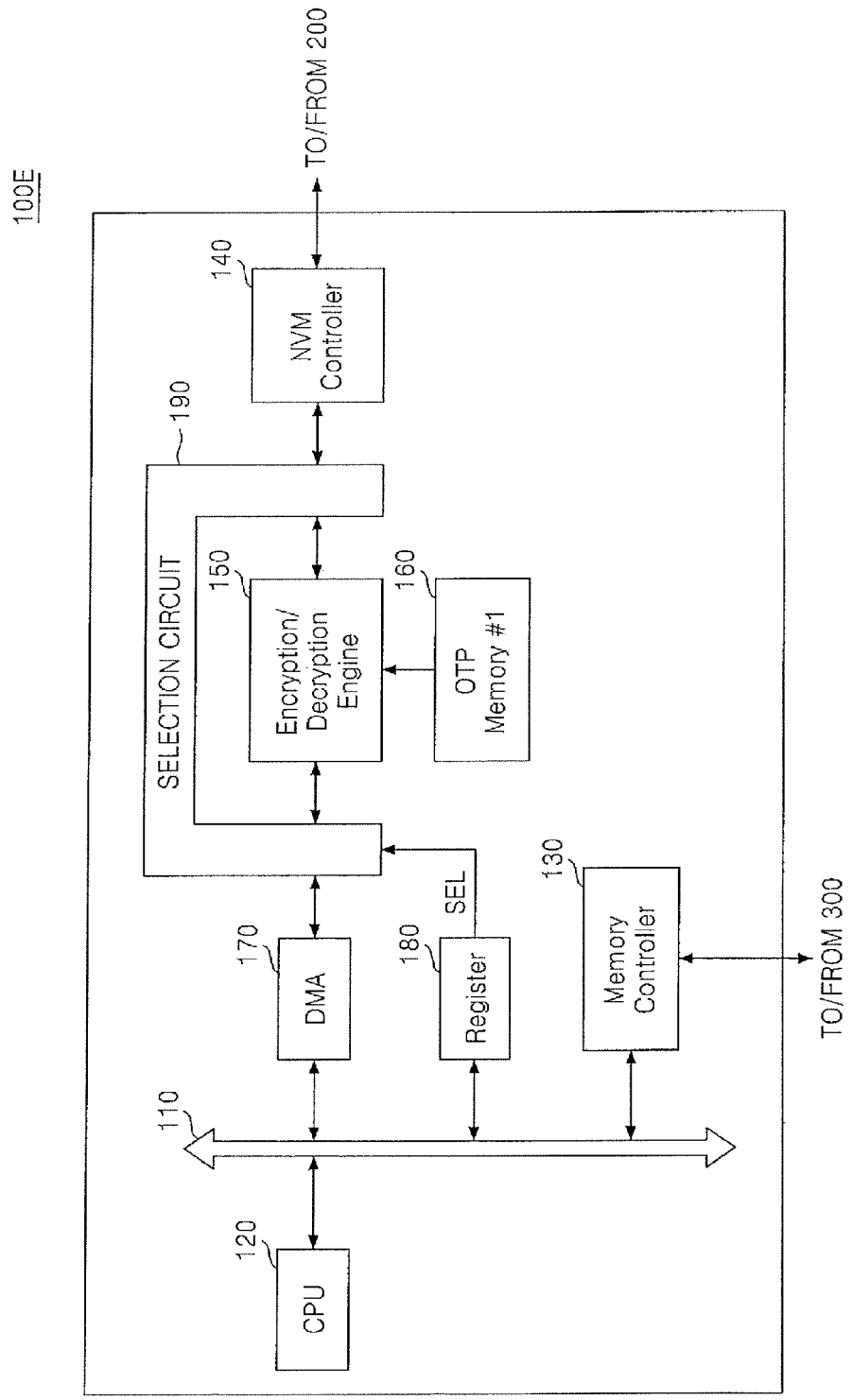
FIG. 7 is a block diagram of the SoC illustrated in FIG. 1 according to an exemplary embodiment of the inventive concept.

FIG. 7 is a block diagram of an SoC 100E which is an exemplary embodiment of the SoC 100 illustrated in FIG. 1. Referring to FIGS. 1, 3, and 7, the SoC 100E includes a bus 110, a CPU 120, a memory controller 130, a non-volatile memory controller 140, an encryption/decryption engine 150, an OTP memory 160, a DMA unit 170, a register 180, and a selection circuit 190.

The register 180 may be connected to the bus 110. The register 180 may operate as a selection signal generator that generates a selection signal SEL. The register 180 may change the selection signal SEL based on whether the CPU 120 executes a secure application program, that is, based on an indication signal that indicates a secure mode. The indication signal may be output by the CPU 120. For example, the indication signal may be a logic high in a secure mode, and the indication signal may be a logic low in a non-secure mode.

The selection circuit 190 may select a data path according to the selection signal SEL output by the register 180. An exemplary structure and an operation of the selection circuit 190 will now be described with reference to FIG. 8.

Figure 8:
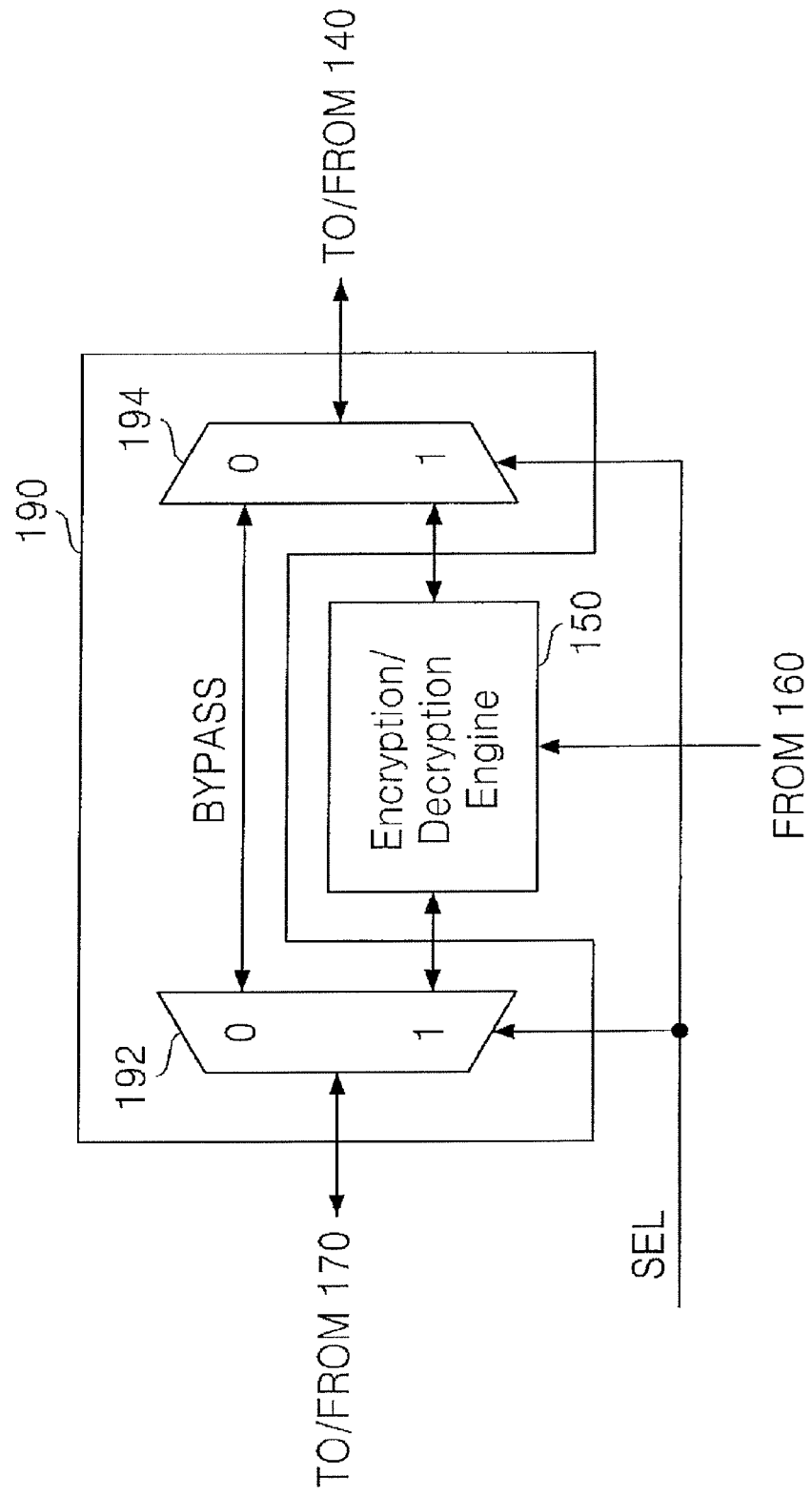
FIG. 8 is a block diagram of a selection circuit and an encryption/decryption engine illustrated in FIG. 7 according to an exemplary embodiment of the inventive concept.

FIG. 8 is a block diagram of the selection circuit 190 and the encryption/decryption engine 150 illustrated in FIG. 7 according to an exemplary embodiment of the inventive concept. Referring to FIGS. 3, 7, and 8, the selection circuit 190 include a first selector 192 and a second selector 194. The first selector 192 may be implemented by using a demultiplexer, and the second selector 194 may be implemented by using a multiplexer.

For example, when the selection signal SEL is a logic high, the selection circuit 190 selects a data path including the encryption/decryption engine 150. When the CPU 120 executes a secure application program, that is, in a secure mode, the selection circuit 190 selects the data path including the encryption/decryption engine 150. In an exemplary embodiment, when the selection signal SEL is a logic low, the selection circuit 190 selects a data path excluding the encryption/decryption engine 150, that is, a bypass path. For example, when the CPU 120 performs a general application program, that is, in a non-secure mode, the selection circuit 190 may select the data path excluding the encryption/decryption engine 150, that is, the bypass path.

Figure 9:
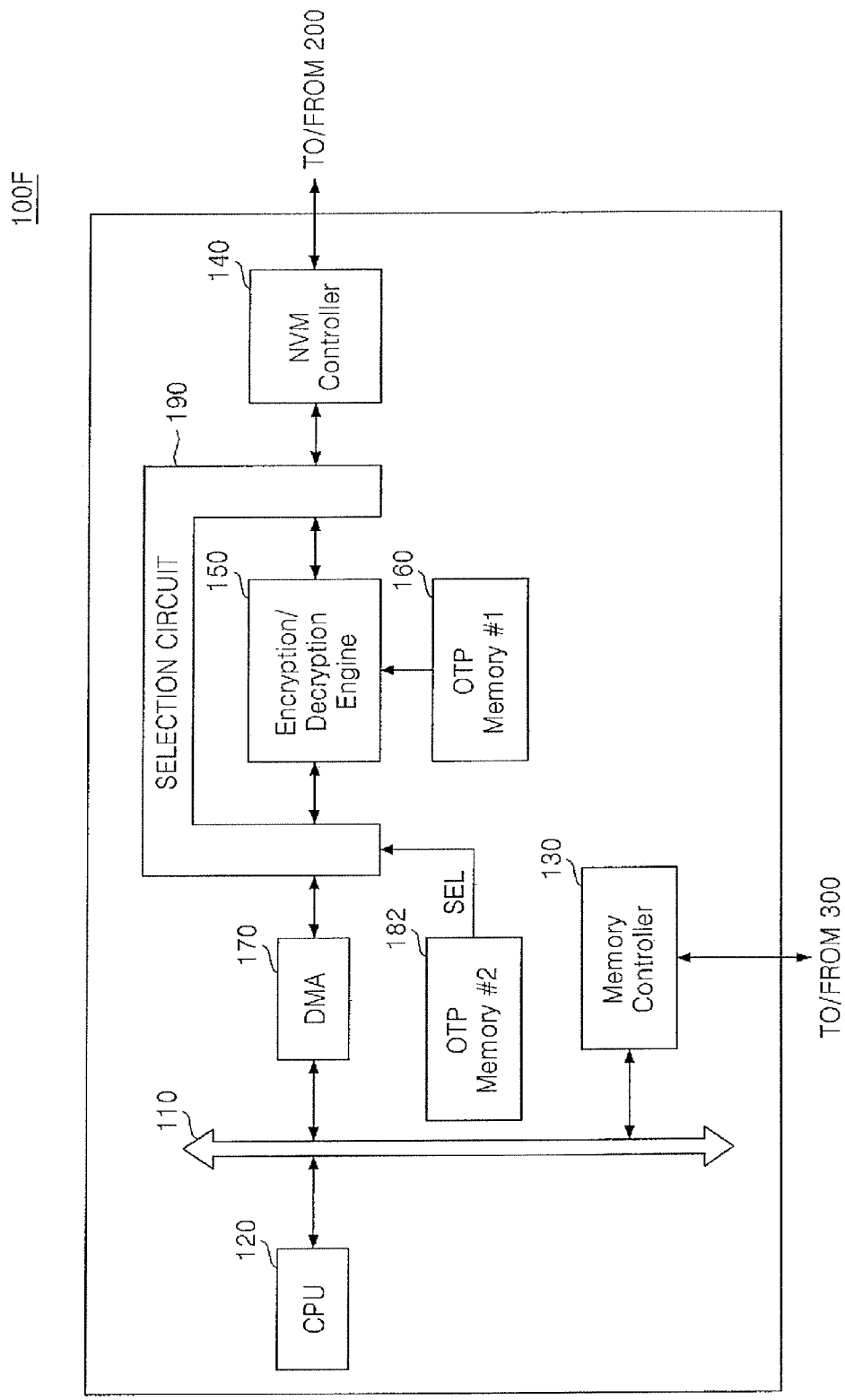
FIG. 9 is a block diagram of the SoC illustrated in FIG. 1 according to an exemplary embodiment of the inventive concept.

FIG. 9 is a block diagram of an SoC 100F which is an exemplary embodiment of the SoC 100 illustrated in FIG. 1. Referring to FIGS. 1, 8, and 9, the SoC 100F includes a bus 110, a CPU 120, a memory controller 130, a non-volatile memory controller 140, an encryption/decryption engine 150, an OTP memory 160, a DMA unit 170, a second OTP memory 182, and a selection circuit 190.

In an exemplary embodiment, the second OTP memory 182 operates as a selection signal generator that generates a selection signal SEL. In an exemplary embodiment, the OTP memory 182 is programmed to generate a selection signal SEL having one logic level, for example, a logic high level. In this embodiment, the selection circuit 190 selects only the data path including the encryption/decryption engine 150.

Figure 10:
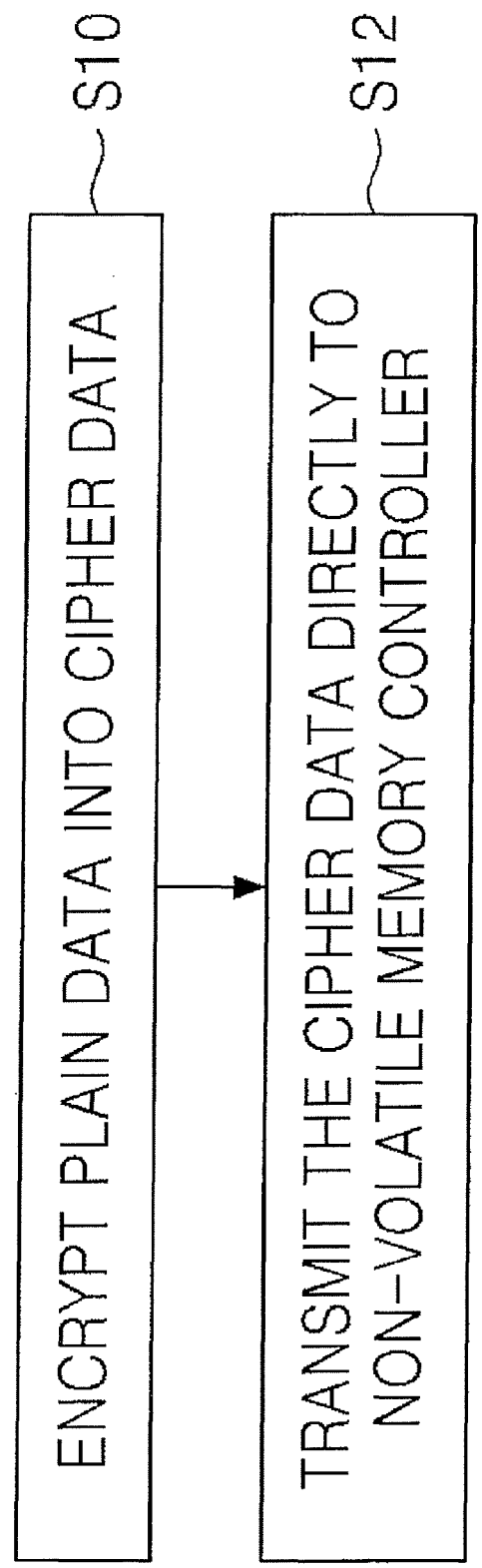
FIG. 10 is a flowchart of a method of operating an SoC, according to an exemplary embodiment of the inventive concept.

FIG. 10 is a flowchart of a method of operating an SoC, according to an exemplary embodiment of the present inventive concept. Referring to FIGS. 2, 4 to 7, 9, and 10, the encryption/decryption engine 150 converts, for example, encrypts, plain data into cipher data by using an encryption key (S10). The encryption/decryption engine 150 may transmit the cipher data directly, for example, on-the-fly, to the non-volatile memory controller 140 (S12). Since the encryption key is present within the SoC 100 and is not output outside the Soc 100, a probe of communications between the Soc and the other memory devices (e.g., 200 and 300) will not discover the key.

Figure 11:
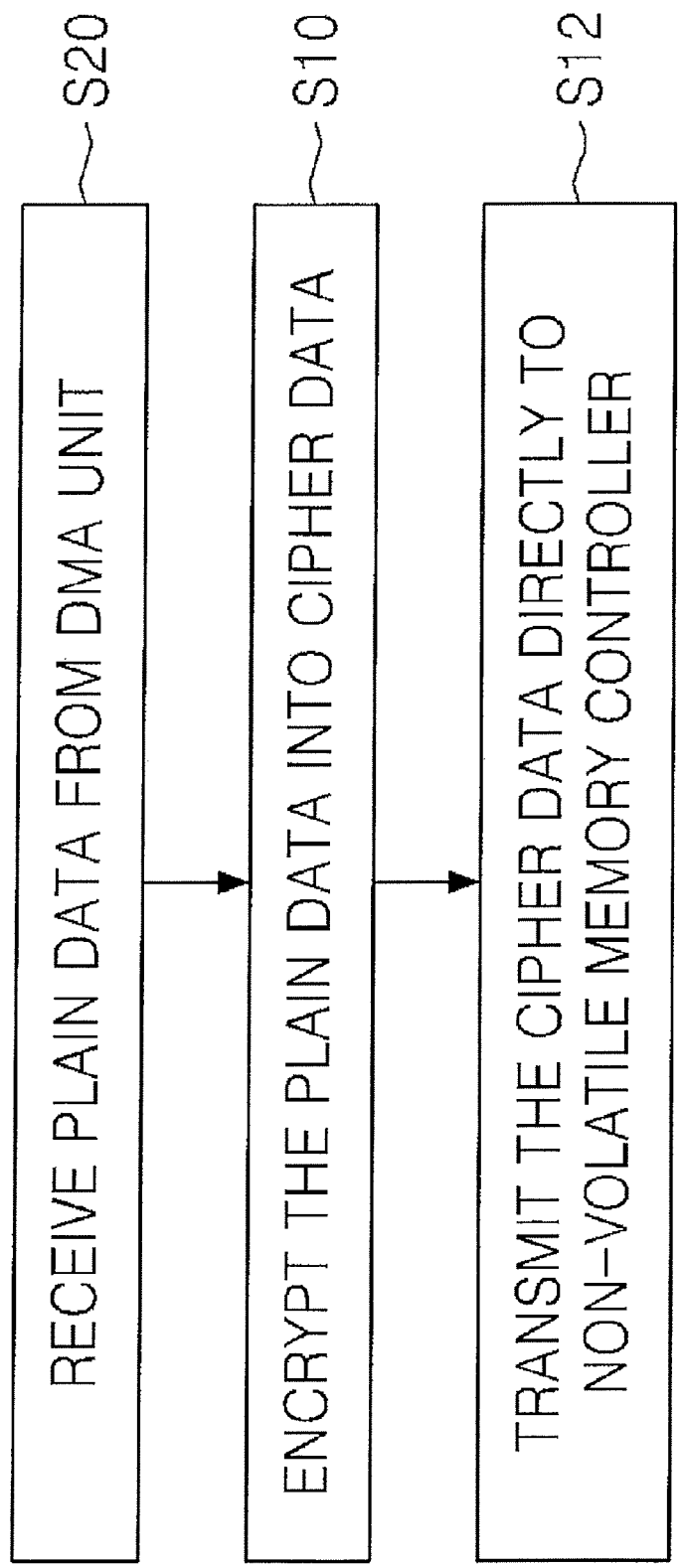
FIG. 11 is a flowchart of a method of operating an SoC, according to an exemplary embodiment of the inventive concept.

FIG. 11 is a flowchart of a method of operating an SoC, according to an exemplary embodiment of the present inventive concept. Referring to FIGS. 5 to 7, 9, and 10, the encryption/decryption engine 150 receives plain data from the DMA unit 170 (S20). In an exemplary embodiment, the encryption/decryption engine 150 receives the plain data directly, for example, on-the-fly, from the DMA unit 170. Then similar to FIG. 10, the engine 150 encrypts the plain data into cipher data (S10) and transmits the cipher data directly to the non-volatile memory controller (S12).

Figure 12:
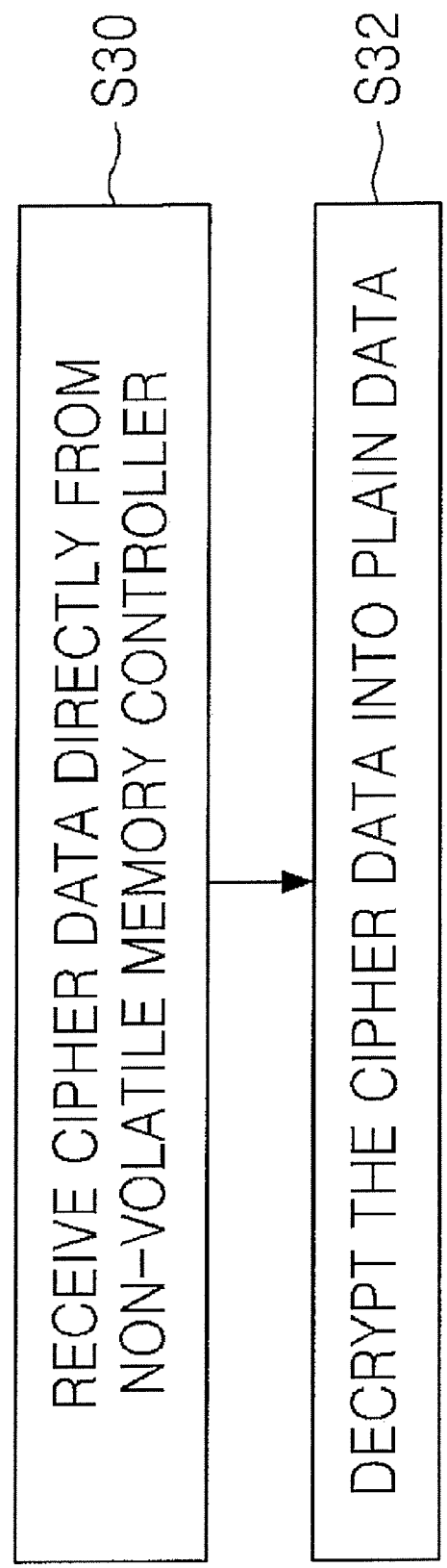
FIG. 12 is a flowchart of a method of operating an SoC, according to an exemplary embodiment of the inventive concept.

FIG. 12 is a flowchart of a method of operating an SoC, according to an exemplary embodiment of the present inventive concept. Referring to FIGS. 2, 4 to 7, 9, and 10, the encryption/decryption engine 150 receive cipher data directly, for example, on-the-fly, from the non-volatile memory controller 140 (S30). The encryption/decryption engine 150 decrypts the cipher data into plain data (S32).

Figure 13:
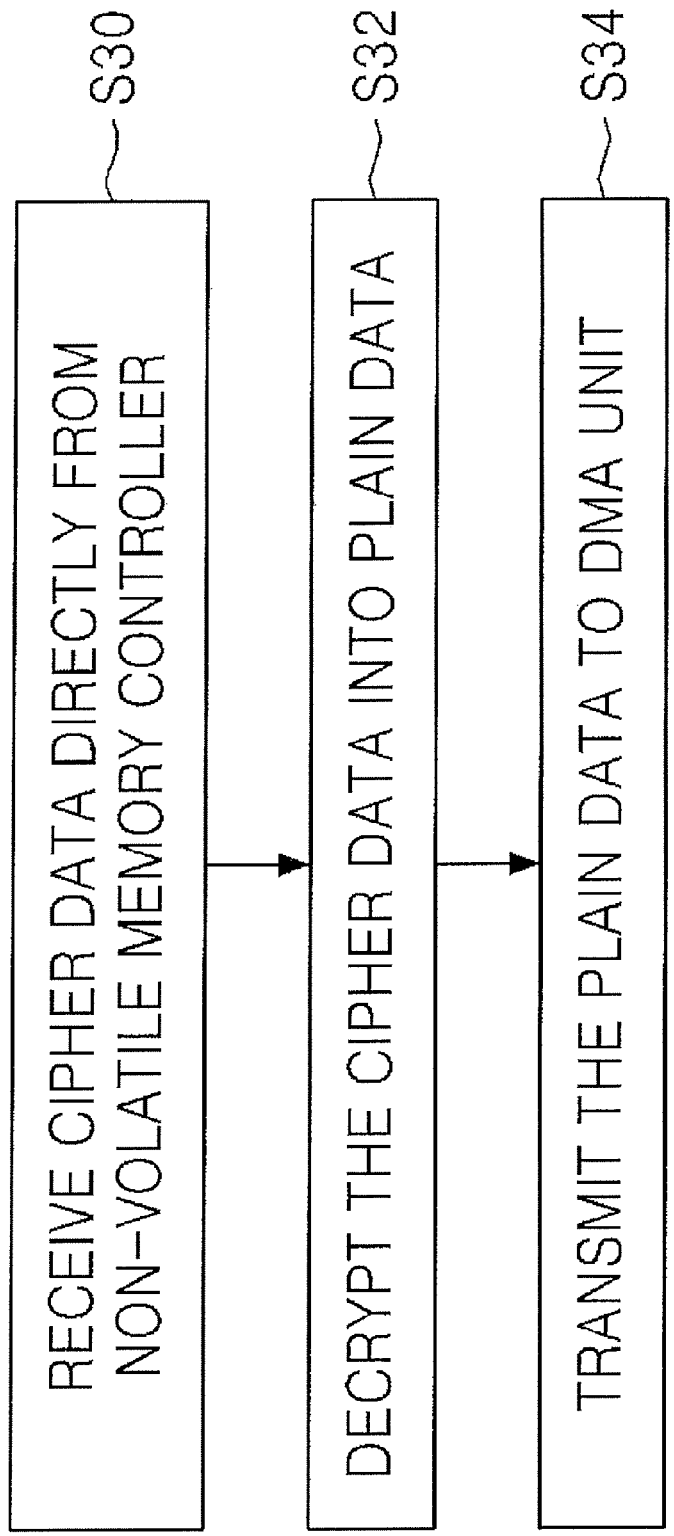
FIG. 13 is a flowchart of a method of operating an SoC, according to an exemplary embodiment of the inventive concept.

FIG. 13 is a flowchart of a method of operating an SoC, according to an exemplary embodiment of the present inventive concept. Similar to FIG. 12, the engine 150 receives cipher data directly from the non-voltage memory controller (S30) and decrypts the cipher data into plain data (S32). Referring to FIGS. 5 to 7, 9, and 13, the encryption/decryption engine 150 transmits the plain data to the DMA unit 170 (S34). In an exemplary embodiment, the encryption/decryption engine 150 transmits plain data directly, for example, on-the-fly, to the DMA unit 170.

Figure 14:
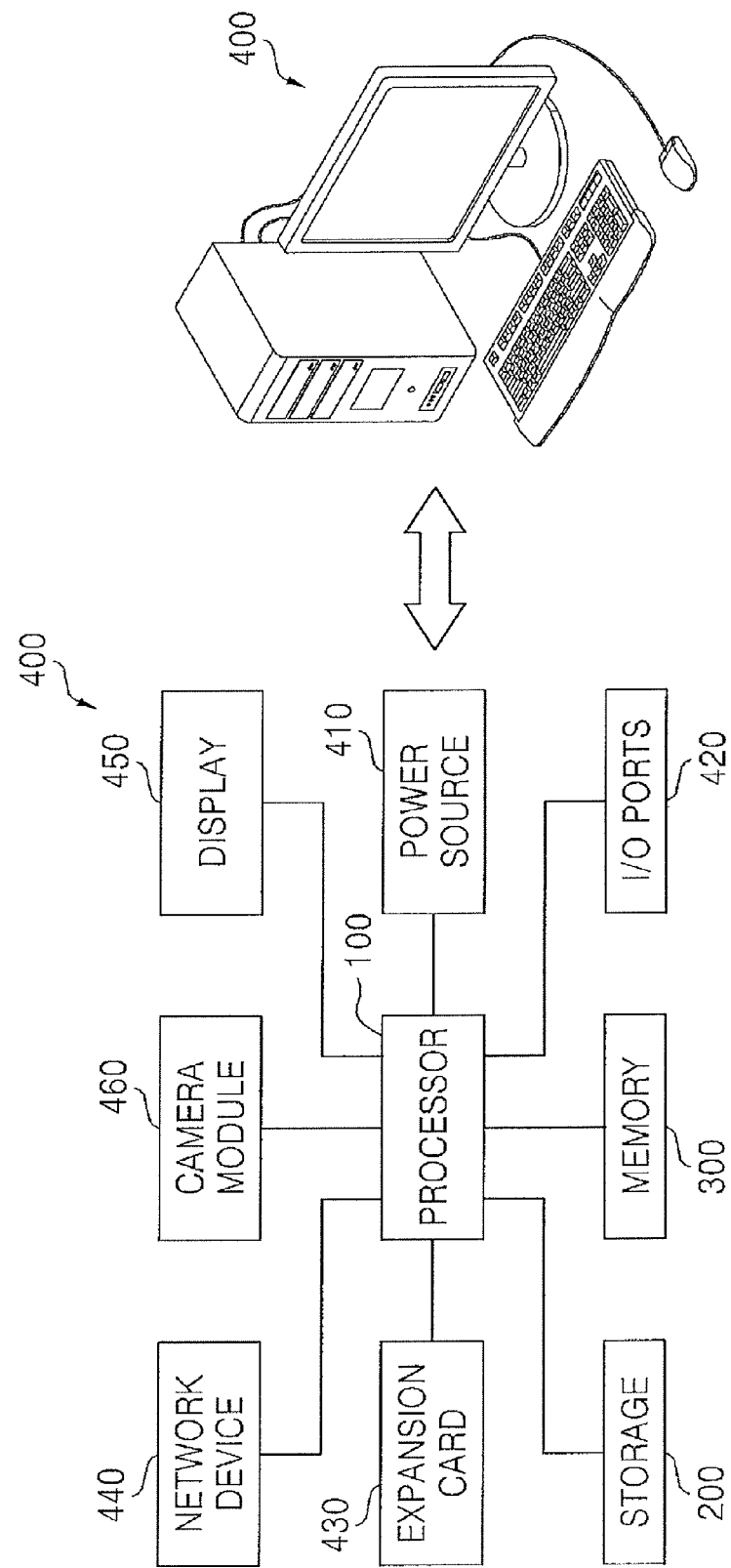
FIG. 14 is a block diagram of a data processing device including the system of FIG. 1, according to an exemplary embodiment of the inventive concept.

FIG. 14 is a block diagram of a data processing device 400 including the system 10 of FIG. 1, according to an exemplary embodiment of the present inventive concept. Referring to FIGS. 1 and 14, the data processing device 400 may be implemented by using a personal computer (PC) or a data server.

The data processing device 400 includes a processor 100, a storage device 200, a memory 300, a power source 410, input/output (I/O) ports 420, an expansion card 430, a network device 440, and a display 450. The data processing device 400 may further include a camera module 460. In an exemplary embodiment, one or more of the elements of the processing device 400 may be omitted.

The processor 100 may correspond to the SoC 100 of FIG. 1. The processor 100 may be a multi-core processor. In an exemplary embodiment, the processor 100 includes the SoC 100 of FIG. 1. The processor 100 may control the operation of at least one of the elements 200, 300, and 410-460.

The storage device 200 may correspond to the non-volatile memory device 200 of FIG. 1. The storage device 200 may be implemented by using a hard disk drive or a solid state drive (SSD).

The memory 300 may correspond to the main memory 300 of FIG. 1. The memory 300 may be implemented by using a volatile memory or a non-volatile memory. In an exemplary embodiment, the memory controller 140 of FIG. 2 is capable of controlling a data access operation, for example, a read operation, a write operation (or a program operation), or an erase operation, with respect to the memory 300. The memory 300 may be may be integrated into or embedded in the processor 100.

The power source 410 may supply an operational voltage to at least one of the elements 100, 200, 300, and 420-460. The I/O ports 420 may be capable of transmitting data to the storage device 200 or transmitting data output from the storage device 200 to an external device. For example, the I/O ports 420 may be a port for connecting a pointing device, such as a computer mouse, to the data processing device 400, a port for connecting a printer to the data processing device 400, or a port for connecting a universal serial bus (USB) drive to the data processing device 400.

The expansion card 430 may be implemented by using a secure digital (SD) card or a multimedia card (MMC). In an exemplary embodiment, the expansion card 430 is a Subscriber Identification Module (SIM) card or a Universal Subscriber Identity Module (USIM) card.

The network device 440 may correspond to a device capable of connecting the storage device 200 to a wired or wireless network. The display 450 may display data output from the storage device 200, the memory 300, the I/O ports 420, the expansion card 430, or the network device 440.

The camera module 460 may be capable of converting an optical image into an electrical image. Accordingly, an electrical image output from the camera module 460 may be stored in the storage device 200, the memory 300, or the expansion card 430. The electrical image output from the camera module 460 may be displayed on the display 450.

Figure 15:
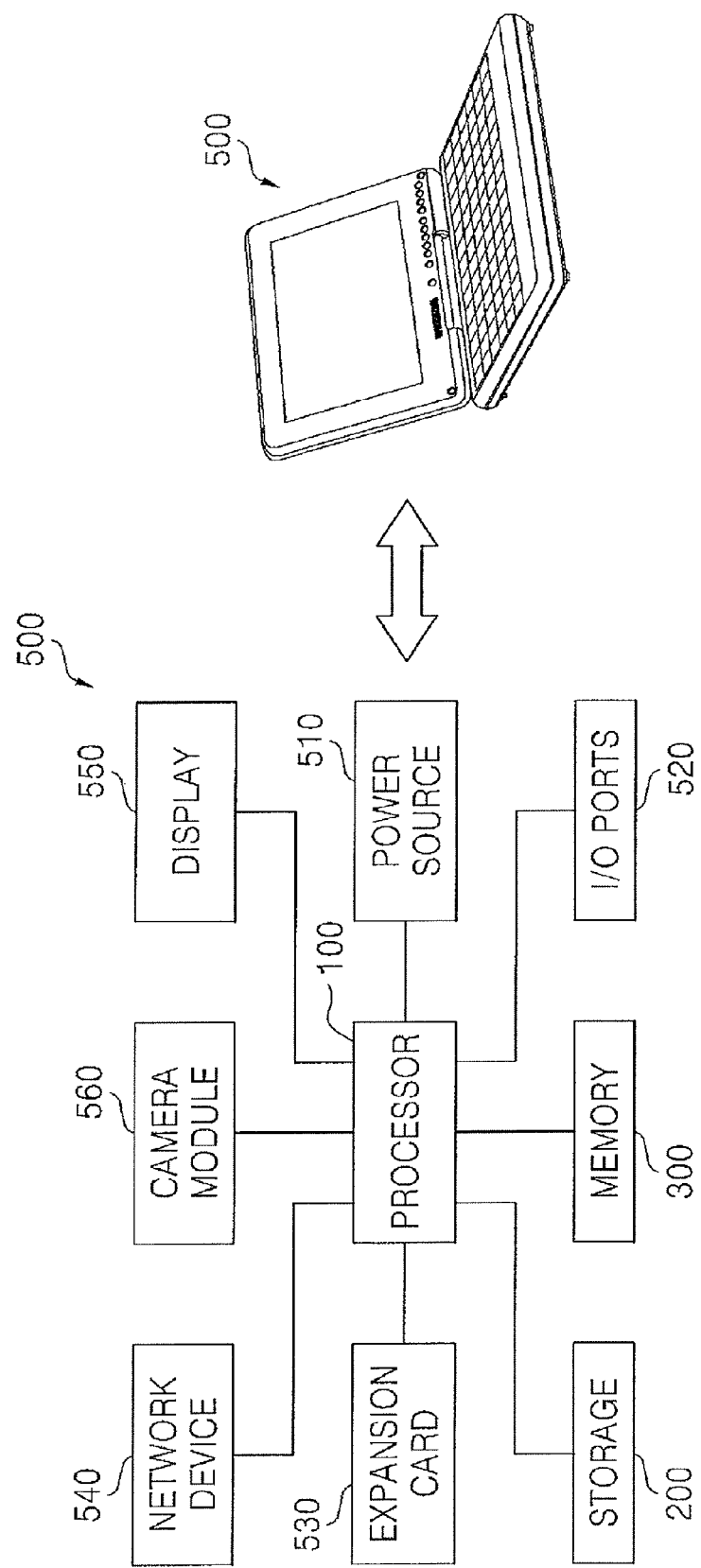
FIG. 15 is a block diagram of a data processing device including the system of FIG. 1, according to an exemplary embodiment of the inventive concept.

FIG. 15 is a block diagram of a data processing device 500 including the system 10 of FIG. 1, according to an exemplary embodiment of the present inventive concept. As an example, the data processing device 500 may be implemented by using a laptop computer.

Similar to the data processing device 400 of FIG. 14, the data processing device 500 of FIG. 15 includes a processor 100, a storage device 200, a memory 300, a power source 510, input/output (I/O) ports 520, an expansion card 530, a network device 540, and a display 550. The data processing device 500 may further include a camera module 560. In an exemplary embodiment, one or more of the elements of the processing device 500 may be omitted.

Figure 16:
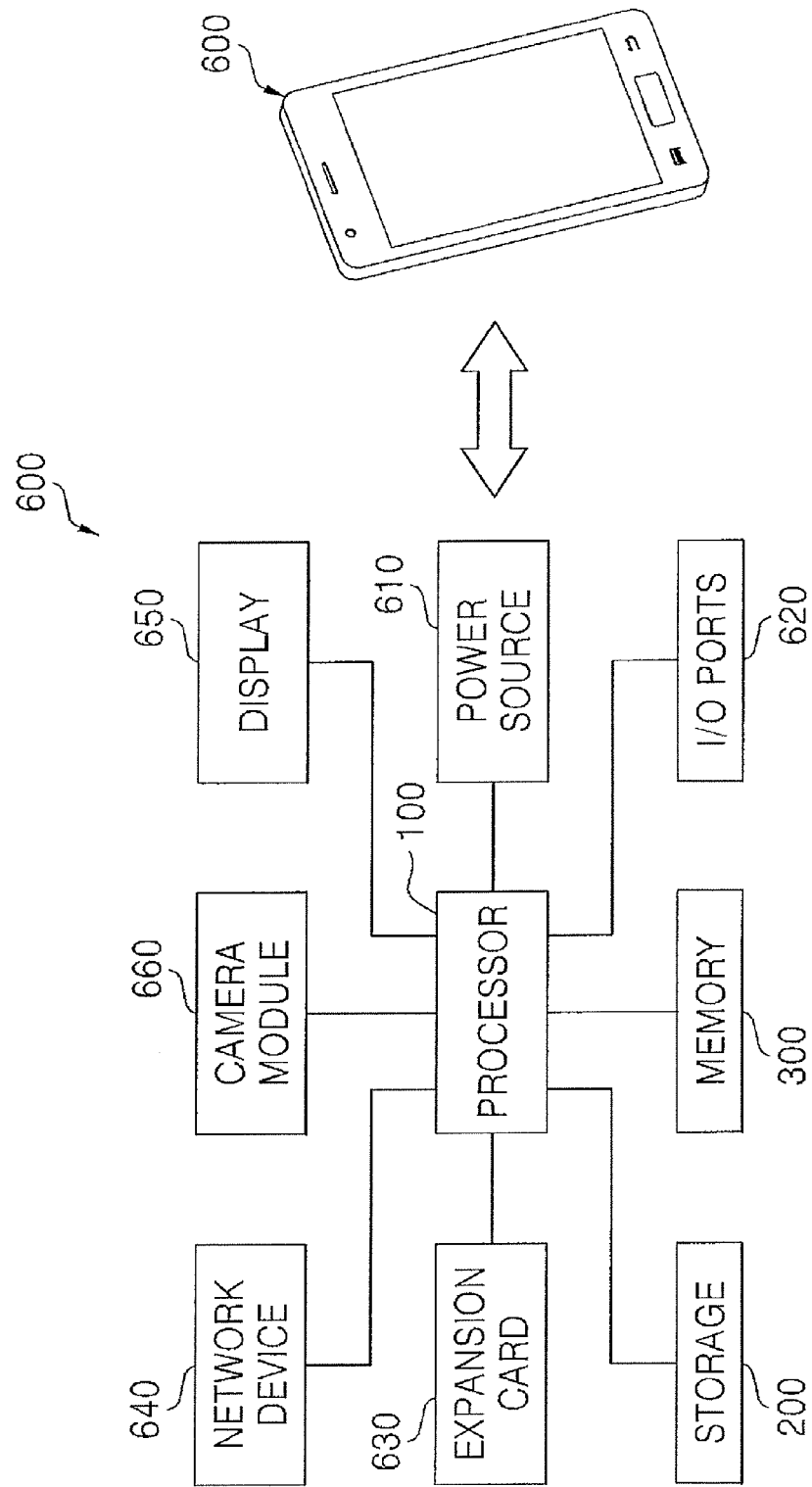
FIG. 16 is a block diagram of a data processing device including the system of FIG. 1, according to an exemplary embodiment of the inventive concept.

FIG. 16 is a block diagram of a data processing device 600 including the system 10 of FIG. 1, according to an exemplary embodiment of the present inventive concept. Referring to FIGS. 1 and 16, the data processing device 600 may be implemented by using a portable device.

The portable device may be implemented by using a mobile phone, a smart phone, a tablet PC, a personal digital assistant (PDA), an enterprise digital assistant (EDA), a digital still camera, a digital video camera, a portable multimedia player (PMP), a personal (or portable) navigation device (PND), a handheld game console, or an e-book.

Similar to the data processing device 400 of FIG. 14, the data processing device 600 of FIG. 16 includes a processor 100, a storage device 200, a memory 300, a power source 610, input/output (I/O) ports 620, an expansion card 630, a network device 640, and a display 650. The data processing device 600 may further include a camera module 660. In an exemplary embodiment, one or more of the elements of the processing device 600 may be omitted.

Figure 17:
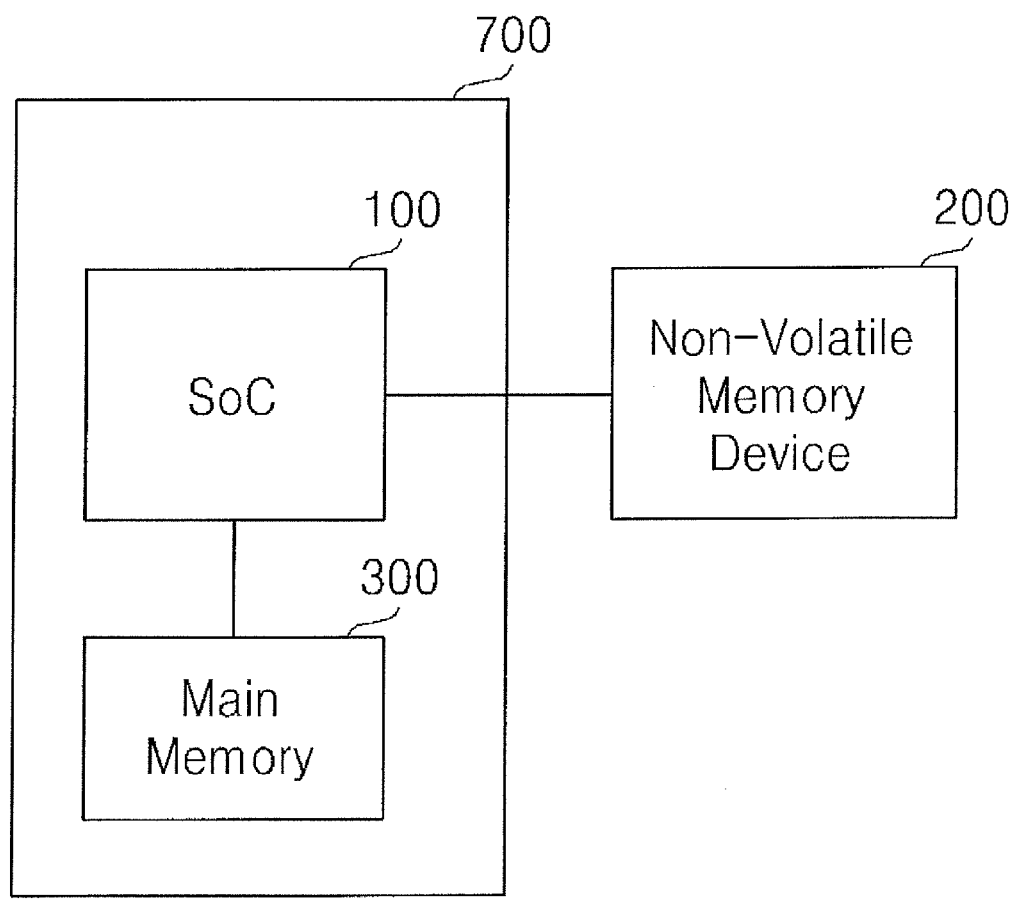
FIG. 17 is a block diagram of a system-in package including the SoC illustrated in FIG. 1, according to an exemplary embodiment of the inventive concept, and a non-volatile memory device illustrated in FIG. 1.
Figure 18:
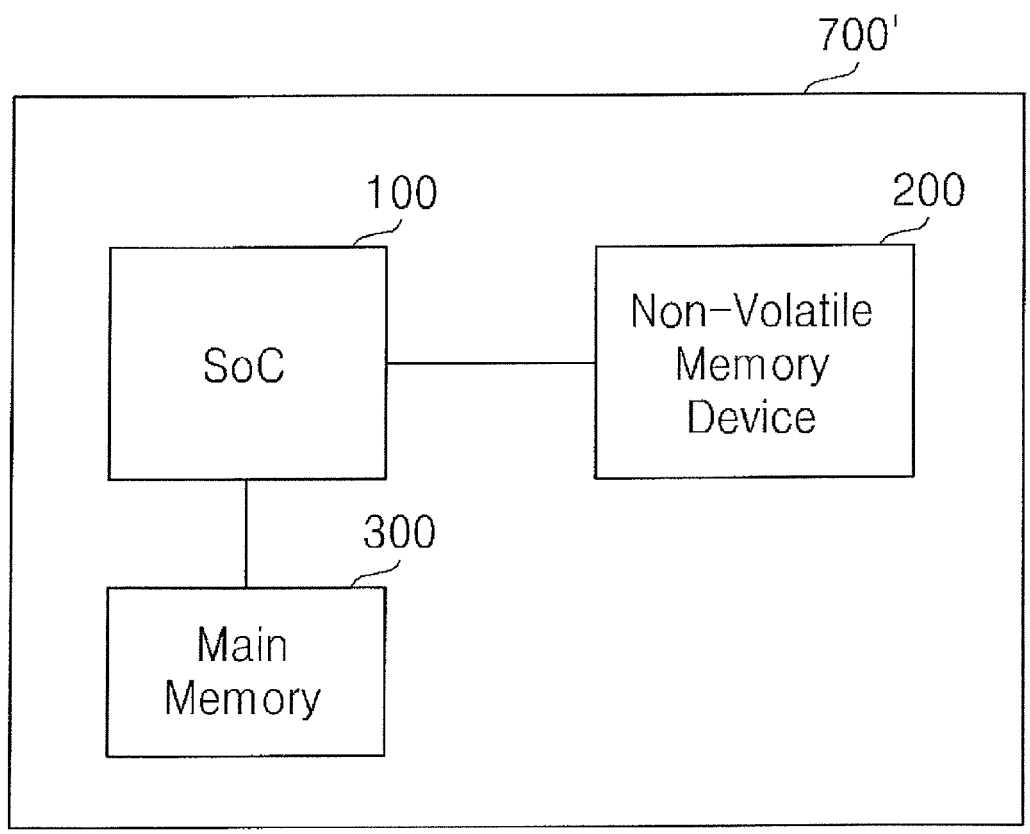
FIG. 18 is a block diagram of a system-in package including the SoC illustrated in FIG. 1, according to an exemplary embodiment of the inventive concept.

FIG. 17 is a block diagram of a system-in package (SiP) 700 including the SoC 100 of FIG. 1, according to an exemplary embodiment of the present inventive concept, and the non-volatile memory device 200 of FIG. 1. FIG. 18 is a block diagram of a SiP 700' including the SoC 100 of FIG. 1, according to an embodiment of the present inventive concept. In an exemplary embodiment, a SIP may be referred to as a Chip Stack MCM (multi chip module). A SiP may include a number of integrated circuits enclosed in a single module or package.

Referring to FIGS. 1 and 17, the SoC 100 and the main memory 300 are packaged into the SiP 700. Thus, the non-volatile memory 200 is located outside the SiP 700 and may be connected to a pin of the SiP 700. Referring to FIGS. 1 and 18, the SoC 100, the non-volatile memory device 200, and the main memory 300 are all packaged into the SiP 700'.

An SoC according to an exemplary embodiment of the present inventive concept encrypts data within the SoC, and thus a probe of communications between the SoC and other devices may be prevented from accessing un-encrypted data. Further, the SoC according to an exemplary embodiment stores an encryption key for encryption within itself without outputting the key outside itself, and thus the encryption key is prevented from being exposed.

In an exemplary embodiment of the inventive concept, software of the SoC is incapable of accessing an encryption key used for encryption, which may prevent the encryption key from being leaked due to hacking. Since the software of the SoC does not participate in encryption, a burden on the software is reduced. In an exemplary embodiment, the SoC includes a directly connected encryption/decryption engine and a memory controller, thereby yielding a shortened data transmission path within the SoC. Therefore, the SoC may have improved performance.

Although exemplary embodiments of the present inventive concept have been shown and described, it will be appreciated by those skilled in the art that various changes may be made in these embodiments without departing from the spirit and scope of the inventive concept.

What is claimed is:

1. A system on chip (SoC) comprising:
    a central processing unit (CPU) on the SoC;
    a volatile memory controller configured to receive plain data from an external volatile memory;
    an encryption engine configured to encrypt the plain data transmitted from the volatile memory controller into cipher data using an encryption key, the encryption key being input to the encryption engine in a secure mode by the CPU;
    a data bus connected to the CPU and the volatile memory controller;
    a non-volatile memory controller configured to receive the cipher data directly from the encryption engine without the cipher data passing through the data bus used to transmit the plain data and to output the cipher data to an external non-volatile memory; and
    a storage medium configured to store the encryption key,
    wherein the encryption engine is directly connected to the non-volatile memory controller such that no devices are connected between the encryption engine and the non-volatile memory controller.

2. The SoC of claim 1, wherein the storage medium is a one-time programmable memory.

3. The SoC of claim 1, wherein the storage medium is a flash memory.

4. The SoC of claim 1, further comprising a direct memory access (DMA) circuit configured to receive the plain data from the volatile memory controller and to transmit the plain data to the encryption engine.

5. The SoC of claim 4, wherein the DMA is connected to the encryption engine.

6. The SoC of claim 3, wherein the plain data is a secure application program independent from a general operating system.

7. The SoC of claim 1, further comprising a selection circuit having a bypass path,
    wherein the plain data is transmitted to the non-volatile memory controller via the bypass path in response to a selection signal, and
    wherein the non-volatile memory controller is configured to transmit the plain data to the external non-volatile memory.

8. The SoC of claim 7, wherein the selection circuit further comprises a multiplexer configured to receive the selection signal and to transmit the plain data to the bypass path.

9. A system on chip (SoC) comprising:
    a central processing unit (CPU) on the SoC;

a volatile memory controller configured to receive plain data from an external volatile memory;

an encryption engine configured to encrypt the plain data transmitted from the volatile memory controller into cipher data using an encryption key;

a data bus connected to the CPU and the volatile memory controller;

a non-volatile memory controller configured to receive the cipher data directly from the encryption engine without the cipher data passing through the data bus used to transmit the plain data and to output the cipher data to an external non-volatile memory; and a storage medium configured to store the encryption key, wherein the encryption engine is directly connected to the non-volatile memory controller such that no devices are connected between the encryption engine and the non-volatile memory controller, and wherein the CPU is prevented from assessing the encryption key.

10. The SoC of claim 9, wherein the plain data is a secure application program independent from a general operating system.

11. The SoC of claim 10, further comprising a direct memory access (DMA) circuit configured to receive the plain data from the volatile memory controller and to transmit the plain data to the encryption engine.

12. The SoC of claim 11, wherein the DMA is connected to the encryption engine.

13. The SoC of claim 12, wherein the storage medium is a one-time programmable memory.

14. The SoC of claim 13, wherein the storage medium is a flash memory.

* * * * *